United States Patent
Hollows

[15] 3,642,621
[45] Feb. 15, 1972

[54] PREPARATION OF FIRE-EXTINGUISHING MATERIAL COMPRISING HEATING BIURET WITH SODIUM OR POTASSIUM HYDROXIDE

[72] Inventor: Frank Brian Hollows, Northwich, England

[73] Assignee: Imperial Chemical Industries Limited, London, England

[22] Filed: Feb. 3, 1969

[21] Appl. No.: 796,156

[30] Foreign Application Priority Data

Feb. 16, 1968  Great Britain.........................7,768/68

[52] U.S. Cl..................................252/5, 106/15, 117/137, 252/2, 252/4, 260/553
[51] Int. Cl. .........................................................A62d 1/00
[58] Field of Search................252/2, 7; 117/137; 106/15 FP; 260/553 B

[56] References Cited

UNITED STATES PATENTS

| | | | |
|---|---|---|---|
| 3,150,177 | 9/1964 | Kluge | 260/553 |
| 3,484,372 | 12/1969 | Birchall | 252/2 |
| 3,536,620 | 10/1970 | Birchall | 252/2 |

Primary Examiner—John T. Goolkasian
Assistant Examiner—D. J. Fritsch
Attorney—Cushman, Darby & Cushman

[57] ABSTRACT

Fire-extinguishing compositions containing the compound having the empirical formula $MC_2N_2H_3O_3$ where M represents sodium or potassium, are made by heating biuret with sodium hydroxide or potassium hydroxide under anhydrous conditions.

3 Claims, No Drawings

PREPARATION OF FIRE-EXTINGUISHING MATERIAL COMPRISING HEATING BIURET WITH SODIUM OR POTASSIUM HYDROXIDE

This invention relates to a novel process for making a fire-extinguishing material having the ability to extinguish flames arising from the combustion of liquid and gaseous fuels such as liquid hydrocarbons, hydrogen, methane and of solid fuels such as wood, paper and textiles.

In U.S. application Ser. No. 676,907 now U.S. Pat. 3,536,620 we have described novel compounds for use in extinguishing fires having the empirical formula $MC_2N_2H_3O_3$, where M represents an atom of sodium or potassium, and made by heating a mixture of urea and at least one alkali selected from bicarbonates, carbonates, sesquicarbonates and hydroxides of sodium and potassium at temperatures below 150° C.

We have now found that these compounds $MC_2N_2H_3O_3$ can be made by reactions between sodium or potassium hydroxides and biuret under anhydrous conditions.

The products of the reactions are mixtures of the compounds $MC_2N_2H_3O_3$ and hydroxides and carbonates of sodium or potassium. They possess fire-extinguishing properties owing principally to the $MC_2N_2H_3O_3$ in them but the alkali hydroxides and carbonates also contribute to the total effect.

The invention thus provides a process for making compositions having fire-extinguishing properties comprising heating biuret with sodium hydroxide or potassium hydroxide in the absence of water.

In one method of carrying out the process the alkali metal hydroxide and the biuret are mixed in powdered form and heated under anhydrous conditions for several hours at a temperature from 100° C. to 130° C.

In another method the alkali metal hydroxide and biuret are heated together in an inert, nonaqueous, liquid reaction medium, for example toluene, xylene and other organic solvents that permit heating or refluxing at temperatures above about 95° C. under atmospheric pressure. The metal hydroxide can conveniently be dissolved in methanol or ethanol and the solution added to a suspension of biuret in, for example, toluene and the mixture heated until all the alcohol is driven off. The reaction mixture is then refluxed, for example for 2 to 6 hours, cooled and the solid phases separated and washed with toluene and dried.

EXAMPLE 1

Biuret (0.10 mole) and potassium hydroxide (0.11 mole) were ground together and the resulting powder compressed into pellets. The pellets were enclosed in a glass tube and heated by means of an oil bath at 120° C. for 3 hours. The product contained 45.7 percent by weight of the compound having the empirical formula $KC_2N_2H_3O_3$. Infrared absorption spectra measurements indicated little unreacted biuret and showed major peaks at 1,300, 1,087, 800 and 765 reciprocal centimeters.

EXAMPLE 2

Biuret (0.10 mole) was suspended in 200 mls. of toluene and a solution of potassium hydroxide (0.10 mole) in 10 mls. of methanol was added to the suspension. The resulting mixture was distilled to remove the methanol and then refluxed for 8 hours. The solid phase was separated, washed with toluene and dried in vacuo at 70° C. It contained 30.3 percent by weight of the compound having the empirical formula $KC_2N_2HO_3$. Infrared absorption spectra measurements showed strong peaks at 1,300, 1,087, 800 and 765 reciprocal centimeters.

What we claim is:

1. A process for making compositions possessing fire-extinguishing properties comprising heating biuret with an alkali selected from sodium hydroxide and potassium hydroxide under anhydrous conditions to a temperature of at least 95° C.

2. A process as claimed in claim 1 in which the alkali metal hydroxide and biuret are mixed in powdered form and heated under anhydrous conditions at 100° C. to 130° C.

3. A process as claimed in claim 1 in which the alkali metal hydroxide and biuret are heated together in an inert, nonaqueous, liquid organic reaction medium of sufficiently high boiling point to allow the reaction system to be heated or refluxed at temperatures above about 95° C. under atmospheric pressure.

* * * * *